United States Patent
Bohn et al.

(10) Patent No.: US 10,212,096 B2
(45) Date of Patent: Feb. 19, 2019

(54) RECEIVED PATH DELAY MECHANISM (71) Applicant: NXP B.V.

(72) Inventors: Sebastian Bohn, Dresden (DE); Matthias Schattka, Dresden (DE)

(73) Assignee: NXP B.V., Eindhoven (NL)

( * ) Notice: Subject to any disclaimer, the term of this patent is extended or adjusted under 35 U.S.C. 154(b) by 160 days.

(21) Appl. No.: 15/374,473

(22) Filed: Dec. 9, 2016

(65) Prior Publication Data

US 2017/0195243 A1 Jul. 6, 2017

(30) Foreign Application Priority Data

Jan. 6, 2016 (EP) .................................... 16150355

(51) Int. Cl.
| | |
|---|---|
| H04L 12/875 | (2013.01) |
| H04L 12/18 | (2006.01) |
| H04L 12/879 | (2013.01) |
| H04L 29/06 | (2006.01) |
| H04W 4/06 | (2009.01) |
| H04H 20/10 | (2008.01) |
| H04H 20/22 | (2008.01) |
| H04H 20/40 | (2008.01) |

(52) U.S. Cl.
CPC .......... *H04L 47/56* (2013.01); *H04H 20/106* (2013.01); *H04H 20/22* (2013.01); *H04H 20/40* (2013.01); *H04L 12/1868* (2013.01); *H04L 12/1881* (2013.01); *H04L 49/901* (2013.01); *H04L 65/4076* (2013.01); *H04W 4/06* (2013.01); *H04H 2201/60* (2013.01)

(58) Field of Classification Search
None
See application file for complete search history.

(56) References Cited

U.S. PATENT DOCUMENTS

| | | |
|---|---|---|
| 2005/0159122 A1 | 7/2005 | Mayer |
| 2010/0150276 A1* | 6/2010 | Yew ................ H04H 60/27 375/340 |
| 2010/0271944 A1* | 10/2010 | Michaelis ............ H04L 45/24 370/230.1 |
| 2013/0003904 A1* | 1/2013 | Elenes ................. H04H 40/18 375/350 |
| 2014/0250072 A1* | 9/2014 | Shtilman ........... G06F 17/30321 707/634 |
| 2016/0182192 A1* | 6/2016 | Milbar .................. H04L 1/08 714/748 |

FOREIGN PATENT DOCUMENTS

EP    2 355 381 A1    8/2011

OTHER PUBLICATIONS

Extended European Search Report for Patent Appln. No. 16150355.2 (dated Jun. 22, 2016).

* cited by examiner

*Primary Examiner* — Saumit Shah
(74) *Attorney, Agent, or Firm* — Rajeev Madnawat (57) ABSTRACT

A method, reception device and host device are provided for aligning data streams at a multi-source receiver. Portions of data for a plurality of data streams are received at a reception device, the plurality of data streams carrying respective content, wherein the content of each data stream is misaligned with at least one other data stream with respect to time. The portions of data are forwarded to a host device to be stored in respective delay buffers. Indexing information is maintained for each of the delay buffers. The portions of data are forwarded to the host device along with the indexing information.

15 Claims, 5 Drawing Sheets

RECEIVED PATH DELAY MECHANISM

CROSS-REFERENCE TO RELATED APPLICATIONS

This application claims the priority under 35 U.S.C. § 119 of European Patent application no. 16150355.2, filed on Jan. 6, 2016, the contents of which are incorporated by reference herein.

FIELD

This invention relates to the reception and processing of broadcast data in a multiple source receiver and in particular but not exclusively to a storage mechanism for the broadcast data.

BACKGROUND

Some modern broadcast receiver devices are designed to support multiple audio inputs from different broadcast domains. For example end user content (such as a radio show) may be received via audio streams from domains such as frequency modulation broadcasting (FM), digital audio broadcasting (DAB) and/or Internet radio. The transmit paths of these audio stream may have varying processing delays which result in streams that are misaligned in time. Initial processing at the receiver may misalign the audio streams further.

It may be a requirement for the broadcast receiver to switch from one audio stream or input to another, for example an input may be lost when the receiver moves out of range of the input's source. Due to the misalignment, the transition may not be seamless which degrades user experience. For example when switching from a transmit path with a short processing delay to a transmit path with a long processing delay, data may not yet be available on the high processing delay path. A potential approach to address this is the buffering of the received audio streams in order to realign the incoming data. However such storing may be subject to restrictions.

Embodiments of the present application may be concerned with a storage mechanism for broadcast data received at a multi-source receiver.

According to a first aspect, there is provided a method for aligning data streams at a multi-source receiver comprising: receiving portions of data for a plurality of data streams at a reception device, the plurality of data streams carrying respective content, wherein the content of each data stream is misaligned with at least one other data stream with respect to time; forwarding the portions of data to a host device to be stored in respective delay buffers; and maintaining by the reception device, indexing information for each of the delay buffers; wherein forwarding the portions of data to the host device further comprises forwarding indexing information for each of the delay buffers with the portions of data.

The indexing information may comprise read and write pointers for each delay buffer. Maintaining indexing information may further comprise: adjusting the read pointers to point to portions in the respective delay buffers carrying corresponding content. The step of forwarding the portions of data to the host device may further comprise: sending a forwarding message to the host device comprising the portions of data and the write pointers. The method may further comprise: sending a request message to the host device for at least one of the stored data portions, the request message comprising an associated read pointer. The method may further comprise: sending the forwarding message and the request message as part of a first communication message.

The method may further comprise: receiving delayed data portions from the host device, wherein the received delayed data portions carry corresponding content. The method may further comprise: rendering at least one of the received delayed data portions to an output. Aa portion of data may have a predetermined size. Forwarding the portions of data to a host device to be stored in respective delay buffers may further comprise forwarding the portions of data in response to one portion of data being received on each of the plurality of data streams. The method may further comprise forwarding the portions of data to a host device to be stored in respective delay buffers periodically.

The method may further comprise: receiving at least one stored portion of data from the host device in response to a request. The method may further comprise: receiving a further portion of data received on a further data stream from an additional source at the host device. The method may further comprise: receiving a portion of data of a further data stream at the host device, the further data stream being received from a further source and carrying the corresponding content. The method may further comprise: sending the received portion of data of the further data stream from the host device to a reception device in response to a request for at least one data portion from the reception device.

Maintaining indexing information for each of the delay buffers may further comprise storing meta information associated with respective data portions. The meta information may comprise quality information of the respective data portion. The method may further comprise: identifying data portions stored at the host device to be requested in dependence on at least the stored meta information. The method may further comprise requesting the identified data portions. Identifying data portions stored at the host device may comprise identifying at least one data portion of sufficient quality to be rendered.

According to a second aspect, there is provided a reception device comprising: a plurality of receivers and associated portion buffers configured to receive portions of data for a plurality of data streams carrying respective content, wherein the content of each data stream is misaligned with at least one other data stream with respect to time; a controller configured to forward the portions of data to a host device to be stored in respective delay buffers; and a memory, which together with the controller, maintains indexing information for each of the delay buffers; wherein the controller is further configured to forward indexing information for each of the delay buffers with the portions of data.

The indexing information may comprise read and write pointers for each delay buffer. The controller may be configured to maintain the indexing information by adjusting the read pointers to point to portions in the respective delay buffers carrying corresponding content. The controller may be configured to send a forwarding message to the host device comprising the portions of data and the write pointers. The controller may be further configured to send a request message to the host device for at least one of the stored data portions, the request message comprising an associated read pointer. The controller may be further configured to send the forwarding message and the request message as part of a first communication message.

The reception device may be further configured to receive delayed data portions from the host device, wherein the received delayed data portions carry corresponding content.

The reception device may be further configured to render at least one of the received delayed data portions to an output. A portion of data may have a predetermined size. The controller may be further configured to forward the portions of data in response to one portion of data being received on each of the plurality of data streams. The controller may be further configured to forward the portions of data to the host device periodically.

The reception device may be further configured to receive at least one stored portion of data from the host device in response to a request. The reception device may be further configured to receive a data portion from a further data stream received at the host device in response to a request for a data portions of at least one of the plurality of data streams. The controller may be further configured to store meta information associated with respective data portions. The meta information may comprise quality information of the respective data portion.

The controller may be further configured to identify data portions stored at the host device to be requested in dependence on at least the stored meta information. The reception device may be further configured to request the identified data portions. The reception device may be further configured to identify at least one data portion of sufficient quality to be rendered.

According to a third aspect, there is provided a method for buffering data streams for a multi-source receiver comprising: receiving portions of data from a reception device in a forwarding message, the portions of data forming part of a plurality of data streams carrying respective content, wherein the content of each data stream is misaligned with at least one other data stream with respect to time; receiving indexing information associated with a plurality of delay buffers in the forwarding message; and storing the portions of data in the respective delay buffers in dependence on the indexing information.

The indexing information may comprise at least a write pointer for each delay buffer. The method may further comprise receiving a request message requesting at least one data portion from the delay buffers, the request message comprising indexing information identifying the data portions requested. The indexing information in the request message may comprise a read pointer associated with the requested data portion(s). The forwarding message and the request message may form a first communication message.

The method may further comprise providing data portions from the delay buffers to the reception device, the provided data portions carry corresponding content. A portion of data may have a predetermined size. The method may further comprise providing at least one stored portion of data from the delay buffers in response to a request from the reception device. The method may further comprise: receiving a further portion of data from a further data stream, the further data stream being received from a further source and carrying the corresponding content. The method may further comprise: providing the further portion of data to a reception device in response to a request for at least one data portion from the delay buffers.

According to a fourth aspect, there is provided a host device for buffering data streams for a multi-source receiver comprising: an input configured to receive portions of data from a reception device in a forwarding message, the portions of data forming part of a plurality of data streams carrying respective content, wherein the content of each data stream is misaligned with at least one other data stream with respect to time, the input further configured to receive indexing information associated with a plurality of delay buffers in the forwarding message; and a plurality of delay buffers configured to store the portions of data in the respective delay buffers in dependence on the indexing information.

The indexing information may comprise at least a write pointer for each delay buffer. The input may be further configured to receive a request message requesting at least one data portion from the delay buffers, the request message comprising indexing information identifying the data portions requested. The indexing information in the request message may comprise a read pointer associated with the requested data portion(s). The forwarding message and the request message may form a first communication message.

The host device may further comprise an output configured to provide data portions from the delay buffers to the reception device, the provided data portions carry corresponding content. A portion of data may have a predetermined size. The host device may further comprise an output configured to provide at least one stored portion of data from the delay buffers in response to a request from the reception device. The input may be further configured to receive a further portion of data from a further data stream, the further data stream being received from a further source and carrying the corresponding content. The output may be further configured to provide the further portion of data to a reception device in response to a request for at least one data portion from the delay buffers.

FIGURES

Embodiments will be described, by way of example only, with reference to the drawings, in which.

It will be appreciated that for features that span more than one drawing like reference numerals indicate the like feature.

DETAILED DESCRIPTION

The following embodiments may be described with reference to packet streams carrying audio data. This has been done for ease of explanation only and it will be appreciated that at least some embodiments may be applicable to other types of broadcast or streaming data, for example video data. It will be appreciated that here the term broadcast is intended to cover packet streams broadcast from one entity to multiple other entities as well as packet stream broadcast from one entity to a specific few or a particular one other entity. For example, the broadcast packet stream may be a unicast stream.

In multi-source transceiver systems, content may be transmitted via a plurality of paths corresponding to different transmission technologies. The content may be commonly generated at a common data source but may be processed and transmitted via different transmit paths. Examples of such transmit technologies may include frequency modulation (FM), digital audio broadcasting (DAB), internet broadcasting and/or others. A multi-source receiving device may be able to receive transmissions of the content along two or more of these paths however, due to processing delays of the respective paths, the commonly generated content carried on the transmission paths may become misaligned.

The receiving device may rely on the content from a first transmission path to be rendered and provided to a user. If the first transmission path becomes unavailable, the receiving device may switch to provide the content from the second transmission path instead. For example, a user may be listening to the content received via an FM transmission while driving, when they drive into a tunnel and lose their FM signal. The receiving device may then switch to a second transmission, for example a DAB transmission path, to continue to provide the content to the user. Due to the differences in a processing time on the first and second paths, the content received and the first path and the content received on the second path may be misaligned. In order for the switch between the first and second path to be less noticeable, the content on the respective paths needs to be aligned. The receiving device may do this by delaying the content from the path that is ahead in time until at least a portion of the content has been received from the first and second paths. The receiving device can introduce this delay by buffering the received data from the first and second paths.

Figure 1:
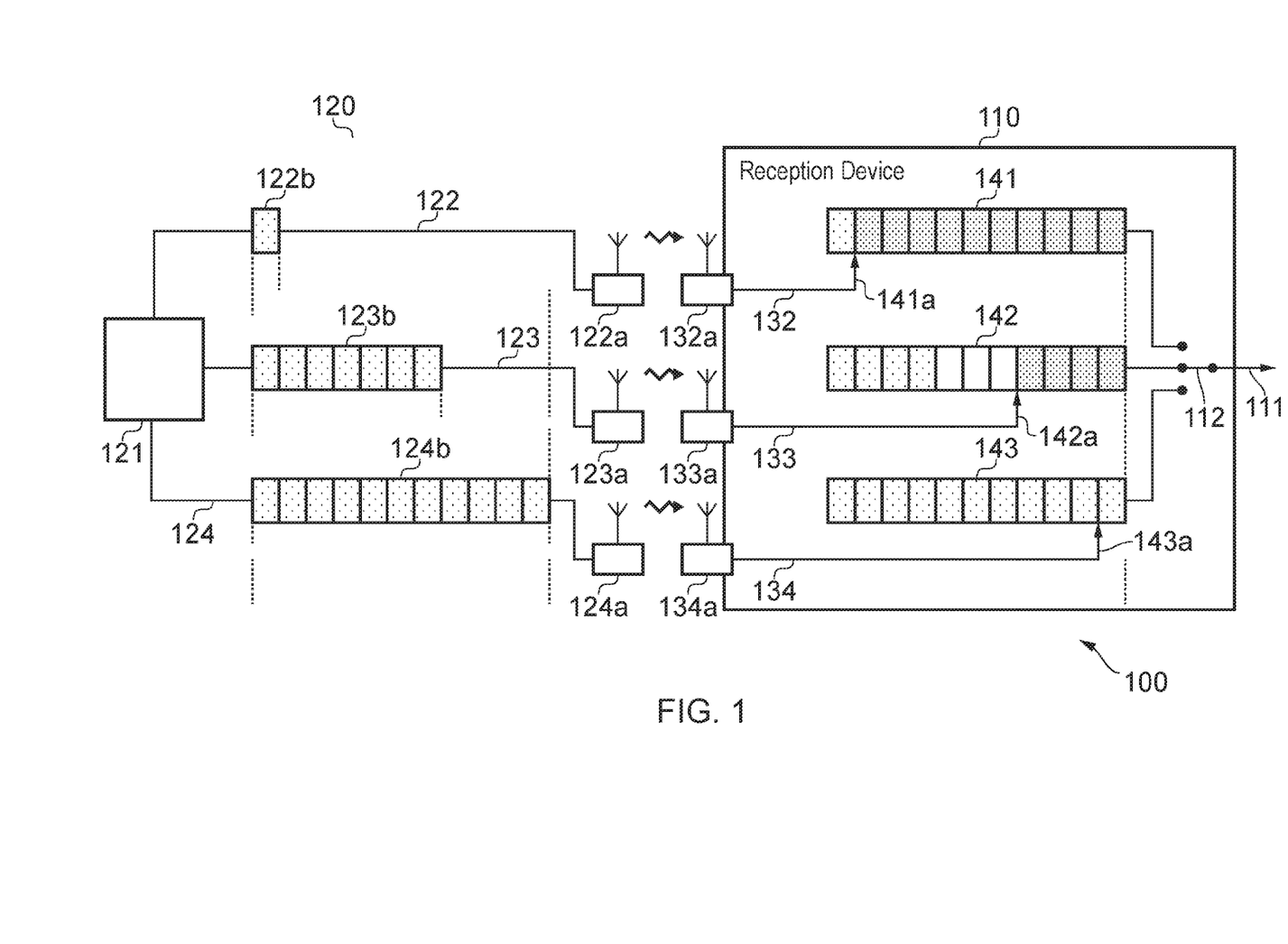
FIG. 1 is a schematic diagram showing an example of a multi-source receiver.

FIG. 1 is an example of such a multi-source transceiver system.

FIG. 1 shows an example of a multi-source broadcast system 100 comprising a receiving device 110 and a transmitting device 120. The transmitting device 120 comprises a common data source 121 and three transmit paths 122, 123 and 124. The common data source 121 may generate content to be transmitted via respective paths 122, 123 and 124. Each transmit path comprises a transmitter 122a, 123a and 124a and a processing delay 122b, 123b and 124b associated with that path.

Each of the transmit paths 122, 123 and 124 may transmit the content according to a different transmission technology. For example the first path 122 may transmit the content based on an analogue technology such as frequency modulation (FM); the second path 123 may transmit the content according to a digital transmit technology such as digital audio broadcasting (DAB); and the third transmit path 124 may transmit the content according to an additional FM or DAB path or other technology. It will be appreciated that this is by way of example only and the paths are not limited to such technologies.

Each of the three transmit technologies may be associated with a delay that is caused by the different processing that the content undergoes before it can be transmitted by the respective transmitters 122a, 123a and 124a. For example, the processing on the first path 122 may cause the content to experience a first delay 122b, the processing on the second path 123 may cause the content to experience a second delay 123b and the processing on the third path 124 may cause the content to experience a third delay 124b. In the above examples, the paths have been exemplified as being FM, DAB and internet broadcast. Accordingly, the first delay 122b associated with FM is relatively short, for example a time A (depicted as one delay block). The second delay 123b associated with DAB is longer, for example a time B (depicted as seven delay blocks). The third delay 124b, associated with internet broadcast, may experience the longest delays, for example a time period C (depicted with eleven delay blocks).

It will be appreciated that the number of delay blocks is by way of example only and function to indicate the differing delays experienced by content generated by a common data source 121 along each path. Accordingly, corresponding content on each path reaches the respective transmitter 122a, 123a and 124a at differing times and the content along the three paths is misaligned with respect to time. For example, the content on the second path 123 may be misaligned by a time (B-A) with respect to the content on the first path 122. The content on the third path 124 may be misaligned by a time (C-A) with respect to the content on the first path 122 and by a time (C-B) with respect to the content on the second path 123.

The receiving device 110 comprises three receive paths 132, 133 and 134, each comprising a respective receiver 132a, 133a, 134a and delay buffer 141, 142 and 143. Data streams comprising the content received on each of the paths 132, 133 and 134 is stored in the respective delay buffer 141, 142 and 143 for that path. An output of the delay buffers is coupled to an output 111 via a selection mechanism 112. The output 111 provides data from a selected delay buffer to be rendered and to provide to a user, for example via a speaker. The rendering may include decoding and further processing to output the content.

In this example, each of the receiver paths 132, 133 and 134 are configured to receive a data stream comprising the commonly generated content and being transmitted according to a different transmission technology. For example, the first receive path 132 may be configured to receive the content transmitted in accordance with FM; the second receive path 133 may be configured to receive the content transmitted in accordance with DAB; and the third receive path 134 may be configured to receive the content transmitted in accordance with internet broadcast.

For example, the first receive path 132 may be configured to receive the content transmitted from the first transmit path 122; the second receive path 133 may be configured to receive the content transmitted from the second transmit path 123; and the third receive path 134 may be configured to receive the user content transmitted from the third transmit path 124.

The respective receivers 132a, 133a and 134a receive respective data streams comprising the content. The content in the data streams may be misaligned due, at least in part, to the delays A, B and C introduced by the relative processing paths 122, 123 and 124.

In this example, in order to realign the content, the receiving device 110 may delay or buffer the respective data streams until at least a portion of the user content has been received on all the packet streams. In general, the delay buffers may delay the availability of data in the buffers to the output for a period corresponding to the delay between the fastest and slowest transmission path. In this manner, data only becomes available to the output, when corresponding user content has been receiver on all the paths. At this point, the data in the buffers (comprising the content) may be made available to the output 111 for rendering.

Delaying the respective data streams may comprise storing received data in a respective data buffer. In the example of FIG. 1, the first path 122, 132 has the shortest processing delay and is the first to start receiving data. The received data stream on the first path is written to the first delay buffer 141. A write pointer 141a of the first delay buffer 141 indicates an amount of data that has been written to the first buffer. The delay between the first and second paths is (B-A) and so the first path 132 receives data for a period of (B-A) before the second path starts receiving data comprising corresponding user content. When data is received on the second path 133, it is written into the second delay buffer 142. A write pointer 142a indicates the amount of data that has been written to the second buffer.

The delay between the first and third paths is (C-A) and so the first path 132 receives data for a period of (C-A) before the third path starts receiving data comprising corresponding user content. The delay between the second and third paths is (C-B) and so the second path 133 receives data for a period of (C-B) before the third path 134 starts receiving data comprising corresponding user content. A write pointer 143a indicates the amount of data written to the third buffer.

FIG. 1 depicts the state of the delay buffers 141, 142 and 143 when a first unit of a data stream comprising the content is received and stored in the third buffer 143. At this point, the first receive path 132 has been receiving the content for a time period of (C-A) and the second receive path 133 has been receiving the content for a time period of (C-B) and the third receive path 134 has just received its first unit of the content. At this point at least a portion of the content is available in all three of the delay buffers 141, 142 and 143 and so the data in the delay buffers 141, 142 and 143 becomes available for selection to be provided to the output 111.

In this example, the buffers are arranged as first-in first-out (FIFO) buffers, however, it will be appreciated that the buffers may take any suitable form.

The read pointers of each buffer 141, 142 and 143 may indicate the next portion of data to be read from the respective buffers. The read pointers of the three buffers 141, 142 and 143 may be synchronised so that they simultaneously point to respective portions of data in the respective buffers that comprise corresponding content. The read pointers may be updated simultaneously as data is processed from at least one of the data streams. This may allow them to remain synchronised. In this manner, if the receive paths are switched between (the switching mechanism 112 couples a different buffer to the output 111) the read pointers of all the buffers point to the same or corresponding position with respect to the content.

The implementation of the buffer size will be dependent on the amount data that needs to be stored for a data stream. This, in turn, is dependent on the size of the data itself as well as the maximum delay between streams. This may result in a system requirement of a large amount of memory. Some systems are limited in the amount of memory that can be provided. For example, an embedded system may have restricted memory space and thus may not be able to provide the requisite amount of memory.

Embodiments of the present application are related to a receiver device that outsources the receive buffers to a further device. In one example, the receive buffers may be outsourced to a host device. The receiver device may store incoming data streams at the host device and request the retrieval of portions of the received data streams for further processing and output.

Figure 2:
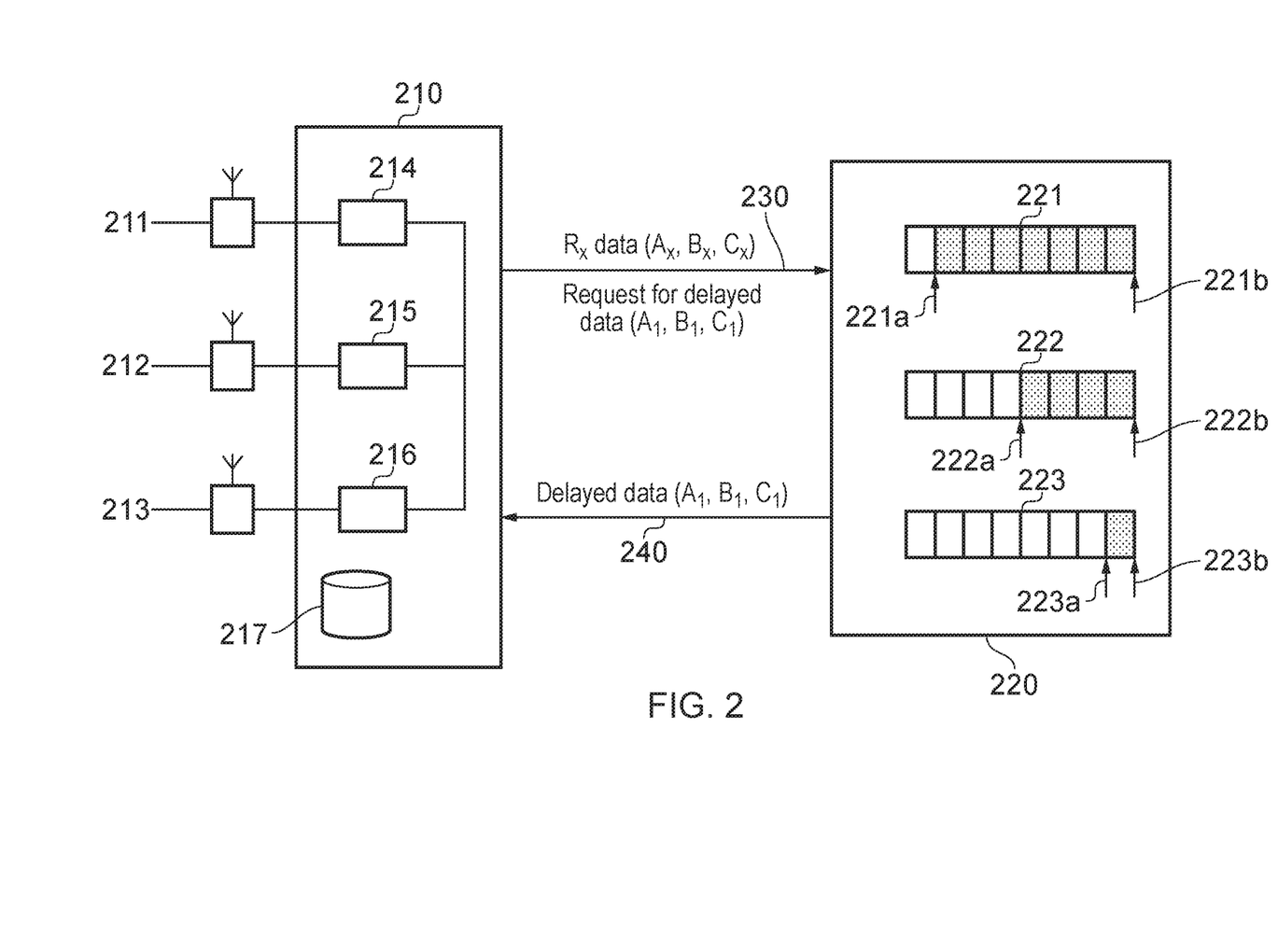
FIG. 2 is a schematic diagram showing an example of a multi-source receiver according to an embodiment.

FIG. 2 shows an example of a multi-source receiver 210 that may receive data streams from multiple sources and delay the data streams by providing them to be stored at a host device.

FIG. 2 shows a receiving device 210 having a first receiver 211, a second receiver 212 and a third receiver 213. It will be appreciate that the first, second and third receivers may be similar to those of FIG. 1 and may be configured to receive data streams from respective transmit paths such as those transmitter by a transmitter, for example transmitter 120.

The first receiver 211 is coupled to a first portion buffer 214, the second receiver 212 is coupled to a second portion buffer 215 and the third receiver 213 is coupled to a third portion buffer 216. The receiving device 210 may further comprise a memory 217. It will be appreciated that the receiving device 210 may further comprise a processor or controller for controlling the receiver. It will be appreciated that the controller may be configured to cause the reception device to carry out any method steps discussed herein.

The receiving device 210 may receive a plurality of data streams from a plurality of sources, where each of the data streams comprise corresponding content. Each of the data streams may be received on a respective one of the receive paths, each comprising a receiver 211, 212, 213 and portion buffer 214, 215 and 216. Like in the example of FIG. 1, the data streams may be buffered and delayed in order to align the corresponding content within the data streams. However, unlike the example of FIG. 1, the delay buffers may be implemented at a host device.

A host device 220 is shown in FIG. 2 comprises a first delay buffer 221, a second delay buffer 222 and a third delay buffer 223. In functionality, the delay buffers 221, 222 and 223 may correspond to the delay buffers 141, 142 and 143 of FIG. 1. In particular, each of the first, second and third delay buffers 221, 222 and 223 may be configured to store one of the data streams received by the receiving device. Each of the delay buffers 221, 222 and 223 may comprise a respective write pointer 221a, 222a and 223a pointing to the next position in the buffer to be written to. Each of the delay buffers 221, 222 and 223 may further comprise a respective read pointer 221b, 222b and 223b. Each of the read pointers may point to a position of corresponding content within the respective buffers.

The receiving device 210 may periodically transmit 230 received data to the host device 220 to be stored in the respective buffers. The host device 220 may receive the transmitted data and store it in the relevant buffers. The receiving device may further transmit 230 a request for stored data from the delay buffers to the host device 220. The host device 220 may read stored data from the delay buffers and provide 240 this to the receiving device. The receiving device may then further processes the data to be output. It will be appreciated that the data read from each of the delay buffers may contain corresponding content as pointed to by the synchronised read pointers 221b, 222b and 223b.

The receiving device 210 may control the storage and retrieval of data from the host device. The receiving device 210 may do this by storing information relating to the delay buffers at the receiving device 210 at memory 217. For example the receiving device 210 may store information relating to the read pointers 221b, 222b, 223b and the write pointers 221a, 222a, 223a and provide this information with the request for data.

In operation, the receiving device 210 may receive three data streams on the three data paths. The received data for each stream may be stored in a respective portion buffer 214, 215, 216. In some examples, the receiving device may carry out some processing on one or more of the received data streams before storing them in the portion buffers. The receiving device 210 may then send a request 230 to the host device to store the data received at the receiving device 210 for each stream.

In one example, a request 230 to the host device 220 may be made once a prerequisite amount of data has been received and stored in a portion buffer for at least one of the data streams. For example, the reception device 210 may receive a portion of data for each receiver path every n milliseconds. The amount of data received before the receiving device 210 forwards the data portions to the host device 220 may be balanced in order to minimize both the size of the portion buffers and the number of messages sent to the host device 220 forwarding the data portions. In one example, where one or more of the receive paths are digital audio broadcast (DAB) paths, the prerequisite portion of data may correspond to a DAB frame and for example, be available every 24 milliseconds. Once a portion of data is received for each data stream, the portions of data stored in each of the portion buffers 214, 215, 216 may be forwarded to the host device 220 for external storage. In this example the data portion for each data stream is sent simultaneously or synchronously in order to reduce the number of messages sent between the receiving device 210 and the host device 220.

The message 230 comprising the data portions to be stored, may further comprise a request for stored or delayed data to be returned to the receiver. This delayed data may correspond to data requested by the receiving device 210 for further processing and output to a user, for example via a loudspeaker.

The receiving device 210 may control the storage and retrieval of the data portions or blocks to the host device 220. For example the receiving device may store indexing data relating to the position of the data in the delay buffers 221, 222 and 223. In one example, a memory 217 may store read and write pointer information and the request 230 may comprise this address information indicating where in the delay buffers to write the forwarded data and where to read requested data. The pointer information in the memory 217 may be updated with each request to write data to the delay buffers and read data from the delay buffers.

In response to the request 230, the host device may send a message 240 comprising the requested delayed data portions for each of the data streams. In this example a communication exchange comprising a combined forwarding of received data portions and requests for delayed data portions 230 as well as a response comprising the requested data portions will take place every time a portion of data is received for each data stream at the receiving device 210. In the example of DAB, this communication exchange may take place every 24 ms.

Figure 3:
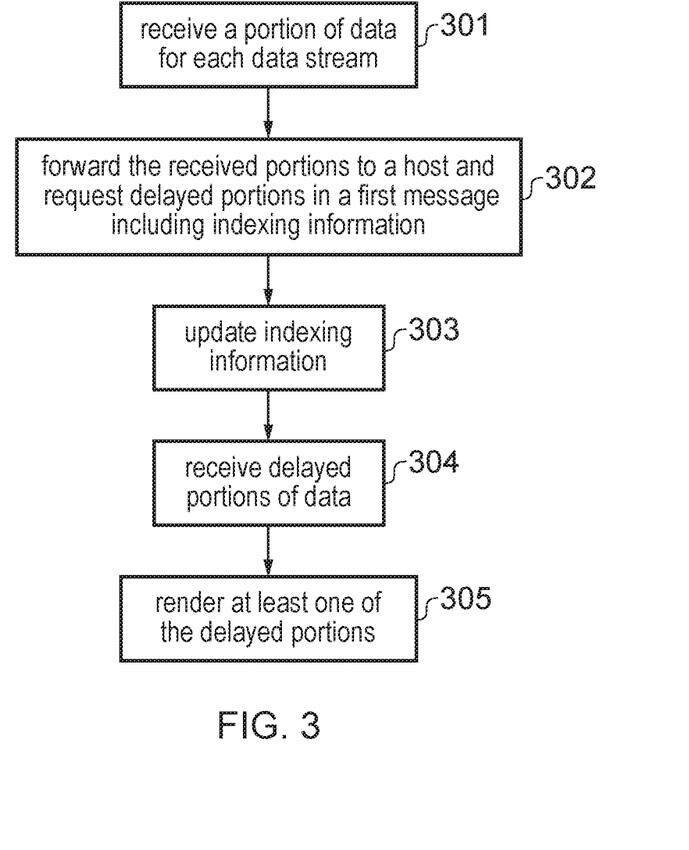
FIG. 3 is a flow diagram depicting the method steps carried out in accordance with an embodiment.

FIG. 3 is a flow diagram depicting the method steps according to one example.

At step 301, a receiving device receives a portion of data for each data stream. The data streams carry corresponding content which may be offset to each other with respect to time. When at least a portion of the data is received on each stream, the method may progress to step 302.

At step 302, the receiving device may send a first message to the host device. The first message may comprise a forwarding message which forwards the received data for the data streams to a host device for storage. The message may contain the received portions of data on the data streams as well as indexing information which indicates where the host device is to store the forwarded portions. The host device may store the forwarded data portions in respective delay buffers corresponding to each of the data streams. The indexing information may include write pointer information indicating to the host device where the data portions are to be written in the delay buffers.

In some examples the receiving device may additionally include a request message in the first message. The request message may comprise a request for delayed data stored in the delay buffers at the host device. The request message may include indexing information. In this case, the indexing information may include read pointer information indicating to the host device where the requested data is to be read from the delay buffers.

At step 303, the receiving device may update the indexing information. The indexing information may be stored at the receiving device and maintained by the receiving device. The write pointers may be updated to point to the next available space in the delay buffers to be written to. The read pointers may be updated to point to the next point in the delay buffers to be read from. It will be appreciated that each of the read pointers will point to corresponding user content in the delay buffers. In order to do so, the receiving device may calculate a delay between user content of the data streams and adjust the respective read pointers with respect to this delay.

At step 304, the receiving device may receive a second message from the host device comprising the requested data portions. The receiving device may then provide the data portions for further processing and/or rendering one or more of the data portions to the output.

Figure 4:
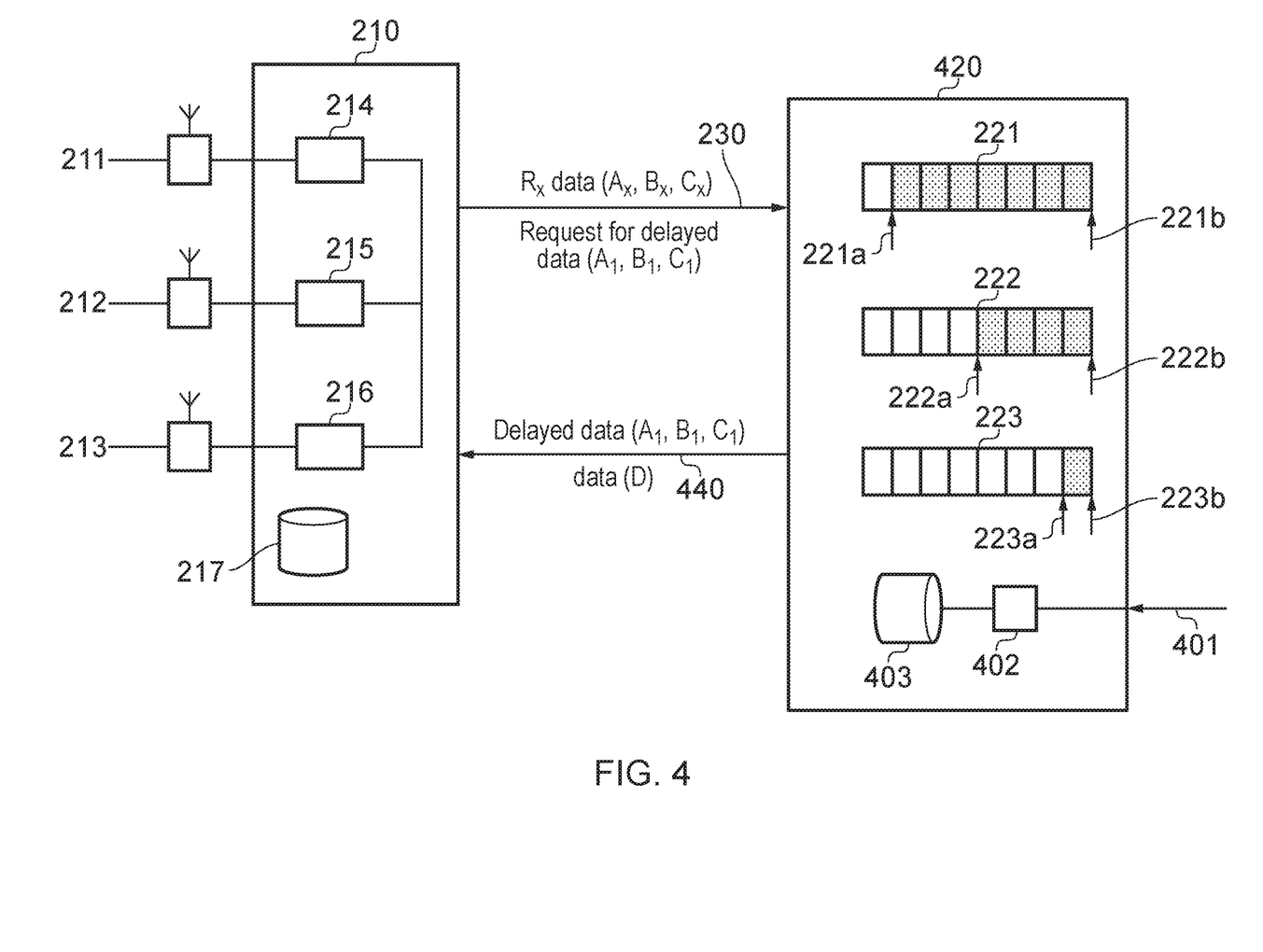
FIG. 4 is a schematic diagram showing an example of a multi-source receiver according to a further embodiment.

FIG. 4 shows a further example of an embodiment. In the example of FIGS. 2 and 3, an example three data streams are depicted as being received by the reception device 210. Portions of data from each stream are stored in a delay buffer at a host device 220. The reception device 210 may request portions of data from the delay buffers in the host device 220 by providing the host device 220 with indexing data for the requested data portions.

In the example of FIG. 4, a host device may be further configured to receive an auxiliary data stream and provide data portions of the auxiliary data stream to the reception device 210. This may be useful in the case where, for example, the auxiliary data stream is an internet protocol (IP). In this example, the auxiliary data is delayed with respect to the data streams received by the reception device. In other words, the auxiliary data stream may experience a transmit and processing delay that is greater than the delay experienced by the other data streams. For example an IP data stream may experience delays that are greater than an FM or DAB data stream. Data content carried by the auxiliary stream may be received at after corresponding data content is received on the other data streams received by the reception device 210.

FIG. 4 shows a reception device 210 and a host device 420. It will be appreciated that parts of the reception device 210 and host device 420 may be similar to the reception device 210 and host device 220 depicted in FIG. 2 and that, in this case, like reference numerals may refer to like features.

The host device 420 has a first, second and third delay buffer 221, 222 and 223 for storing data portions received on a respective first, second and third data stream 211, 212 and 213 and received in a message 230 from the reception device 210. The host device 420 may further comprise an auxiliary input 401 for receiving an auxiliary or additional data stream. In one example, the auxiliary data stream may be an IP stream received via a network to which the host device 420 is coupled.

The data stream received on the auxiliary input 401 may be stored in an auxiliary buffer 403. The host device 420 may also comprise an optional sample rate converter 402. In some examples, the data streams 211, 212 and 213 may be considered to have the same sample rate. The auxiliary data stream may have another sample rate. In examples, the sample rate of the auxiliary data stream 401 may be converted to be the same as the sample rate of data stream 211, 212 and 213. This may ease a processing burden when processing the respective streams.

It will however be appreciated that the sample rate converter 402 may be optional. In some cases differences in sample rates may be dealt with in the processing of the data streams. It will also be appreciated that the data streams 211, 212 and 213 need not necessarily have the same sample rates and similar measures, for example sample rate conversion or data stream processing, may be applied to them.

The example of FIG. 4 may operate similarly to that of FIG. 2. For example, after a portion of the data streams 211, 212 and 213 have been received, the reception device 210 may send a first message 230 to the host device. The first message may comprise a request to store the data portions and may include indexing data associated with the data buffers 221, 222 and 223. The first message 230 may further constitute a request for delayed data from the data streams 211, 212 and 213.

In response the first message 230 or request, the host device may respond with a second message 440 comprising the requested delayed data from the buffers 221, 222 and 223. If a data portion is available in the auxiliary buffer 403, then that data portion received on the auxiliary data stream may be provided to the reception device 210 in the second message 440.

It will be appreciated that while the requested data portions for the data streams 211, 212 and 213 comprise data portions that have been delayed by the buffer, the data portion from the auxiliary data stream may not be delayed. This may be because the auxiliary data stream 401 may have the longest delay with regards to the corresponding content carried on the data streams 211, 212, 213 and 401. In other words, the content received by the auxiliary data stream 401 may already have been received on the data streams 211, 212 and 213 and thus need not be further delayed.

It will be appreciated that the required size of the buffers 221, 222 and 223 may depend on the amount of delay to the data stream that a buffer is to introduce. The auxiliary buffer may be smaller than the buffers 221, 222 and 223 as the auxiliary buffer need only buffer a portion of the data stream 401 for the time taken in one communication round. In this case a communication round comprises the time for the message 230 to be sent and replied to with message 440. A data portion may be read from the auxiliary buffer 403 in each communication round.

With reference to FIG. 3, in the example in accordance with FIG. 4, the reception device 210 will additionally receive a data portion from the auxiliary data stream at step 304. At step 305, the reception device may further select from the received data portions, including the data portion on the auxiliary data stream, for rendering.

The example of FIG. 4 has been described with the reception device 210 providing no indexing information for the auxiliary data buffer or data stream. This is appropriate in embodiments where the corresponding content is received on the data streams 211, 212 and 213 before being received on the auxiliary data stream 401 and the data buffers 221, 222 and 223 delay the data streams accordingly. In other examples, the reception device may also provide explicit indexing information for the auxiliary data stream and/or buffer. This indexing information may for example related to dynamic buffer sizing and/or may control the fill level of the auxiliary buffer. In some further embodiments, the indexing information may control a delay to the auxiliary data stream in the auxiliary buffer and/or may indicate or set a size of the data portion to be provided in the message 440.

In an example, the auxiliary buffer 403 may be used for processing such as equalling out side effects from reception jitter or sample rate conversion. It may allow consideration for advanced decision logic, like error handling, when its fill level is being constantly monitored by the reception device.

In the foregoing, the reception device 210 has been described as storing and maintaining indexing information for the buffers 221, 222 and 223. As described, this indexing information may comprise read and write pointers or information as to where to next write in the buffer and where to next read from in the buffer. In a further example, the reception device 210 may further store and maintain meta information associated with the data streams. This meta information may for example comprise quality information relating to the quality of the data portions being received on each data stream and being stored at the host device 220.

For block-based audio streams, data portions carried by each of the data streams 211, 212 and 213 may arrive periodically at the reception device 210. In the case of a reception issue, a gap in the reception of data portions for one or more of the data streams may occur. In an extreme example, no data at all may arrive in a periodic reception window for a data stream. In other examples, data received for a data portion may be (partially) defective or fully received. The reception device 210 may be aware of properties such as these for a data portion on reception of the data portion—for example before the data portion is sent for storage and/or received to be rendered.

Information regarding the quality of a data portion can be considered to be meta-information. This meta information may for example be stored along with the actual data portion. Once the data portion is to be used, the associated meta-information stored alongside the data portion may be assessed for use in the selection and rendering of a data portion. For example the meta information may be used to decide whether the associated data portion may be decoded or should rather shall be omitted because it is faulty or missing data. Advanced error concealment processing may also be carried out on the basis of this meta-information, for example gradually fading out still good audio and/or switching data streams to be rendered based on upcoming reception gaps.

In the present application, the delay buffers may be outsourced to a host device 220, 420. In the case where meta information is stored alongside the data portions, this meta information is not immediately accessible to a reception device 210 due to the communication delay between the reception device 210 and host device 220, 420. Furthermore, requesting a delayed data portion from a host and receiving said data portion and associated meta information before being able determine that the data portion should be discarded increases the communication overhead.

Figure 5:
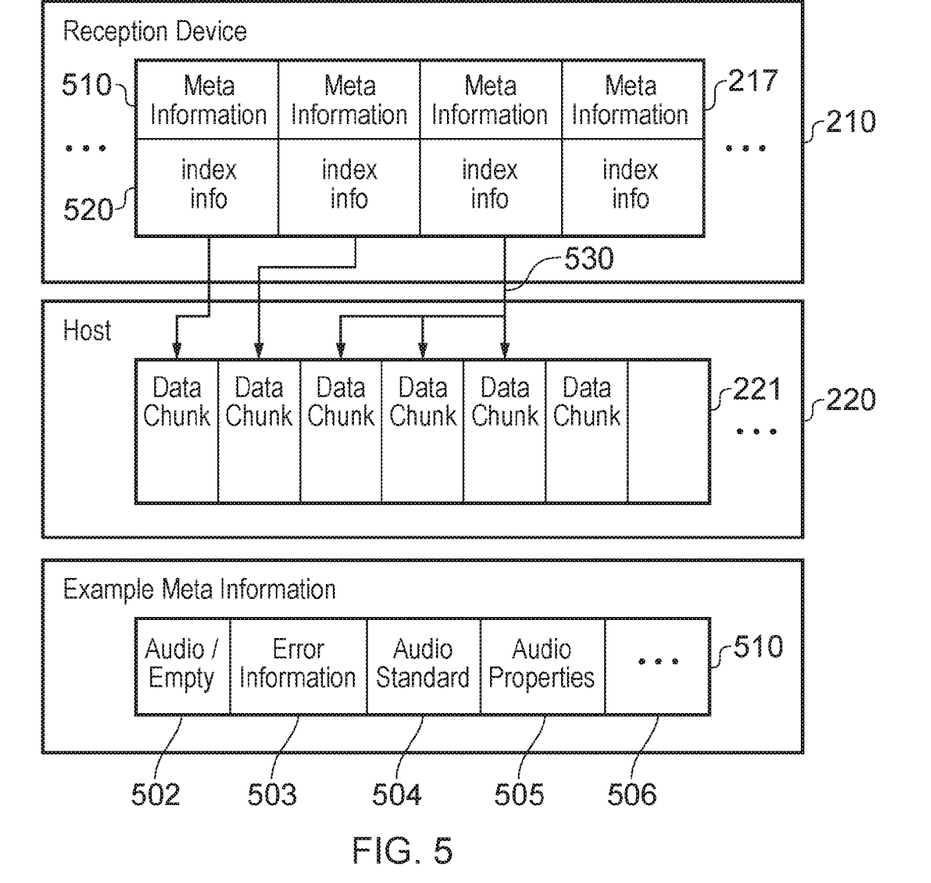
FIG. 5 is a schematic diagram showing aspects of a multi-source receiver according to a further embodiment.

A further example of a reception and host device is provided according to FIG. 5 in which meta information corresponding to received data portions is stored in the reception device 210. This may allow the reception device 210 to make decisions regarding which of the data portions carrying corresponding content to render or process further and which to discard. In some examples, the reception device 210 may further selectively request which buffers 221, 222, 223 to be read from.

FIG. 5 shows a portion of the reception device 210 and host device 220 where meta information is stored at the reception device 210 for data portions stored at the host device 220.

FIG. 5 shows the portion of the reception device 210 comprising a memory 217. The memory 217 comprises indexing information 520 and meta information 510 associated with data portions stored in the host device 220. The portion of the host device 220 comprising a data buffer 221 is shown. It will be appreciated that while indexing and meta information and a data buffer is shown only for the first data stream 221, similar provisions are made for the other data streams.

Each stored data portion in the data buffer 221 may be associated with indexing information 520 and meta information 510. This is shown by the associated 530. It will be appreciated that in some examples indexing and/or meta information may be the same for more than one consecutive data portion.

FIG. 5 further shows an example of meta information 510. In this example, the meta information may comprise a plurality of fields, for example an indication whether the data portion comprises audio or is empty (Audio/Empty 502), error information associated with the data portion (Error Information 503), the audio standard to which the portion relates (Audio Standard 504), one or more properties of the data portion (Audio Properties 505) and further optional additional fields 506.

Referring to FIG. 3, in operation the reception device 210 may determine meta information from the received data portions before forwarding them to the host device for storage at step 302. The reception device 210 may further determine from the meta information 510 which data portions to request at step 302 and send indexing information accordingly. The reception device 210 may be able to look-ahead with respect to the available quality of the delayed data stream based on the meta-information for externally stored data portions. The reception device 210 may pre-decide whether a data portion would be suitable for rendering and/or is needed.

In the example of FIG. 5, the reception device 210 may request delayed data portions from selected data streams or buffers. It will be appreciated that in other example this is also possible and the reception device need not request data portions from all the data buffers.

The foregoing describes a portion of data being received for each of the data streams at the reception device before those portions are sent to the host device for storage. It will be appreciated that the amount of data making up a portion of data may be determined in dependence on the nature of the data streams received by the reception device. For example, if one of the data streams transmits data according to a DAB standard, the data portion may correspond to a maximum size for a DAB frame.

In another example, one or more data streams may be transmitted in accordance with DAB+ which comprises DAB super frames. In one example these super frames may be received in 120 ms corresponding to five consecutive DAB frames of 24 ms each. For a DAB+ stream, a data portion may be selected to correspond to the super frame size or corresponding to a subset of the super frame for example. In another example, one of the data streams may be transmitted in accordance with T-DMB in which case the transmitted frames may vary in size. In this case a data portion size may be selected on a for example maximum frame size or using other criteria.

It will be appreciated that the choice of the size of the data portion which is to be received by the reception device and then forwarded to the host for storage may be dependent on the transmission standard(s) being received at the reception device. In some examples, the data portion size may correspond to a maximum frame size of at least one of the standards or may be another predetermined size.

The data portion size may be fixed for all of the received data streams in some examples. This may simplify the storage and retrieval of data portions from the data buffers. For example, a data portion is available at the reception device on all the data streams at the same time. In other examples, a data portion size may be selected for individual data streams and may be tailored to the transmission standard of each stream.

In the foregoing a communication round has been depicted as a first message forwarding a plurality of data portions to a host device for storage and a request for stored data portion(s) to be retrieved from the host device. The request may form part of the first message or may be sent separately. A second message is returned from the host comprising the requested data. It will however be appreciated that in some cases, the communication round may omit the request for data from the host device. For example, in some communication rounds, the reception device may not require more data, for example independence on a buffer fill status at the reception device for data to be rendered.

In the foregoing it has been described that the reception device may make a identify data portions to be retrieved from the host device in dependence on meta information stored at the reception device and associated with the data portion. It will be appreciated that such identification may be made in dependence on additional or alternative factors. For example, the identification may also be based on a buffer fill level at the reception device or a preferred data stream in the case that data portions are of similar quality. For example, the reception device may prioritise data portions from the currently rendered data stream rather than having to swap back and forth between the streams excessively.

It will be appreciated that the reception device and the host device will comprise an interface for communicating between them. For example, each of the reception device and host device may comprise and input and output port for sending and receiving messages, for example during a communication round.

The invention claimed is:

1. A reception device comprising:
a plurality of receivers and associated portion buffers configured to receive portions of data for a plurality of data streams carrying respective content, wherein the content of each data stream is misaligned with at least one other data stream with respect to time;
a controller configured to forward the portions of data to a host device to be stored in respective delay buffers, wherein the controller is configured to forward the portions of data when the portions of data for each of the plurality of data streams have been received and stored; and
a memory, which together with the controller, maintains indexing information for each of the delay buffers;
wherein the controller is further configured to forward indexing information for each of the delay buffers with the portions of data, wherein a portion of data is requested from the delay buffers by providing indexing information of the requested portion of data.

2. The reception device of claim 1, wherein the indexing information comprises read and write pointers for each delay buffer.

3. The reception device of claim 2, wherein the controller is configured to maintain the indexing information by adjusting the read pointers to point to portions in the respective delay buffers carrying corresponding content.

4. The reception device of claim 1, further configured to receive delayed data portions from the host device, wherein the received delayed data portions carry corresponding content.

5. The reception device of claim 1, further configured to receive at least one stored portion of data from the host device in response to a request.

6. The reception device of claim 1, further configured to receive a data portion from an auxiliary data stream received at the host device in response to a request for a data portions of at least one of the plurality of data streams.

7. The reception device of claim 1, wherein the controller is further configured to store meta information associated with respective data portions.

8. The reception device of claim 7, wherein the controller is further configured to identify data portions stored at the host device to be requested in dependence on at least the stored meta information.

9. A method for aligning data streams at a multi-source receiver comprising:
    receiving portions of data for a plurality of data streams at a reception device, the plurality of data streams carrying respective content, wherein the content of each data stream is misaligned with at least one other data stream with respect to time;
    forwarding the portions of data to a host device to be stored in respective delay buffers, wherein the forwarding occurs when the portions of data for each of the plurality of data streams have been received and stored; and
    maintaining by the reception device, indexing information for each of the delay buffers;
    wherein forwarding the portions of data to the host device further comprises forwarding indexing information for each of the delay buffers with the portions of data, wherein a portion of data is requested from the delay buffers by providing indexing information of the requested portion of data.

10. A host device for buffering data streams for a multi-source receiver comprising:
    an input configured to receive portions of data from a reception device in a forwarding message, the portions of data forming part of a plurality of data streams carrying respective content, wherein the content of each data stream is misaligned with at least one other data stream with respect to time, the input further configured to receive indexing information associated with a plurality of delay buffers in the forwarding message, wherein the reception device is configured to forward the portions of data when the portions of data for each of the plurality of data streams have been received and stored; and
    a plurality of delay buffers configured to store the portions of data in the respective delay buffers in dependence on the indexing information, wherein a portion of data is requested from the delay buffers by providing indexing information of the requested portion of data.

11. The host device of claim 10, wherein the input is further configured to receive a request message requesting at least one data portion from the delay buffers, the request message comprising indexing information identifying the data portions requested.

12. The host device of claim 10, further comprising an output configured to provide at least one stored portion of data from the delay buffers in response to a request from the reception device.

13. The host device of claim 10, wherein the input is further configured to receive a further portion of data from an auxiliary data stream, the auxiliary data stream being received from a further source and carrying the corresponding content.

14. The host device of claim 13, wherein the output is further configured to provide the further portion of data to a reception device in response to a request for at least one data portion from the delay buffers.

15. A method for buffering data streams for a multi-source receiver comprising:
    receiving portions of data from a reception device in a forwarding message, the portions of data forming part of a plurality of data streams carrying respective content, wherein the content of each data stream is misaligned with at least one other data stream with respect to time, wherein the reception device is configured to forward the portions of data when the portions of data for each of the plurality of data streams have been received and stored;
    receiving indexing information associated with a plurality of delay buffers in the forwarding message; and
    storing the portions of data in the respective delay buffers in dependence on the indexing information, wherein a portion of data is requested from the delay buffers by providing indexing information of the requested portion of data.

* * * * *